Patented Aug. 15, 1950

2,519,038

UNITED STATES PATENT OFFICE 2,519,038

PRODUCTION OF LYSINE AND INTERMEDIATES

Alexander Galat, Yonkers, N. Y.

No Drawing. Application November 15, 1946,
Serial No. 710,216

5 Claims. (Cl. 260—518)

My invention relates to an improved process for the manufacture of $\alpha,\epsilon$-diaminocaproic acid, or lysine, and to certain intermediates obtained in the course of such manufacture.

Lysine is an indispensable constituent of food, being necessary for the maintenance of health and proper assimilation of other food substances by the animal organism, and is classified as one of the essential amino-acids. However, many natural proteins, for instance, gliadin, zein, etc., are very poor in this amino-acid; hence, where the protein component of the diet consists in large part of gliadin, zein and the like, it must be either supplemented by other protein rich in lysine, or reinforced by the addition of lysine itself.

Both the isolation of lysine from proteins and its synthesis have until now been exceedingly costly, so that the reinforcement of foods with this amino-acid was, as a general proposition, quite out of the question, particularly in the diet of agricultural animals.

It is accordingly the general object of the present invention to provide a process for the synthesis of dl-lysine, whereby such acid can be obtained at such low cost as to make it practical to use it for the supplementation even of animal foods.

More specifically, it is an object of the invention to provide a simple and efficient process for the manufacture of dl-lysine from $\epsilon$-aminocaproic acid, or from derivatives of such monoamino acid which can readily be converted thereinto, such as $\epsilon$-caprolactam.

Other objects and advantages of the invention will appear from the following detailed description of the invention.

dl-Lysine has already been synthesized by a variety of methods but they all suffered from one or more if the disadvantages of being lengthy, tedious, low in yield, or expensive by reason of the employment of special materials which are not commonly available. See Berichte 35, 3772, 1902; Compt. rend. trav. lab., Carlsbad, 6, 1, 1903; J. Chem. Soc. 1939, 1564; J. Pharm. Soc. Japan, 550, 1044, 1927.

Eck and Marvel ("Organic Syntheses," Coll. vol. 2) have modified an earlier synthesis by von Braun (Ber. 42, 839, 1909), and used $\epsilon$-caprolactam as the starting material. This was converted into $\epsilon$-benzoylaminocaproic acid, which was then brominated with phosphorus and bromine, thereby ultimately yielding $\epsilon$-benzoylamino-$\alpha$-bromocaproic acid. This intermediate was then ammonolyzed with aqueous ammonia and finally hydrolyzed to split off the protective benzoyl group.

Both the Eck-Marvel and von Braun syntheses are, however, very difficult to perform, and their yields are not satisfactory. Even on a laboratory scale the bromination step causes very great difficulty, which is increased when reasonably large-scale operations are attempted. Extremely great care must be exercized during the treatment with phosphorus and bromine, and when fairly large quantities are worked with, it becomes practically impossible to prevent such large losses as to make the process uneconomical. This is due largely to the fact that the reaction between phosphorus, bromine, and $\epsilon$-benzoylaminocaproic acid is very exothermic. In order to avoid decomposition and charring, effective cooling and stirring are essential. However, the reaction mixture has the consistency of a heavy tar, making efficient stirring and abstraction of heat almost impossible. The use of diluents is extremely detrimental to the yield, the latter decreasing by as much as 50 per cent if dilution is attempted ("Organic Syntheses," vol. 2, page 75, Note 1). Because of these circumstances the yield obtained by the bromination step is very erratic and may vary by as much as 30 per cent from one run to another even on a laboratory scale. As the scale of the runs is increased, the yield decreases correspondingly, since the factors of exothermicity, stirring, and removal of heat become progressively more critical and more difficult to control. In addition to these disadvantages, the known methods required the use of considerable amounts of the relatively expensive phosphorus and bromine.

I have found that $\epsilon$-acylaminocaproic acids may be $\alpha$-halogenated rapidly, simply and economically by the use of sulfuryl halides, and particularly the chloride, as the halogenating agent. The sulfuryl halides are readily available and are relatively inexpensive. That these reagents would halogenate the $\alpha$-carbon of $\epsilon$-acylaminocaproic acid was, however, quite unexpected in view of the fact that the starting compounds contained two points which are vulnerable to attack by the reagent; namely, the amido group and the $\alpha$-hydrogen. It is well known, and it has been my experience also, that the amido group is by far more reactive than the $\alpha$-hydrogen, and should therefore be preferentially attacked. Thus I have found that when benzoylamino acetic acid, $C_6H_5CONHCH_2COOH$ is reacted with excess sulfuryl chloride in the presence of a small amount of a catalyst, such as iodine, there is obtained a chlorinated compound which contains chlorine in the amido group but none in the α-position. Again when benzoyl amino propionic acid,

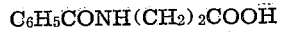

is reacted with excess sulfuryl chloride and a catalyst, there is obtained a chlorinated compound which contains chlorine in the amido group but none attached to the α-carbon.

It was therefore surprising to discover that when ε-benzoylaminocaproic acid,

was treated in exactly the same manner as the acetic, propionic and butyric acid compounds, the chlorine atom became attached to the α-carbon and the α-chloro acid was obtained in yields close to one hundred per cent of the theory.

I have found further that, in contrast to the reaction with phosphorus and bromine, the ε-acylaminocaproic acid react with sulfuryl halides smoothly, non-exothermically, and at moderate temperatures, and form clear, homogeneous solutions which need not be stirred or cooled. Also, in contrast to the reaction with phosphorus and bromine, I obtain with sulfuryl halides consistent and reproducible yields which do not vary materially from one run to another, and are practically independent of the scale of such runs. Moreover, the yields of my improved process are considerably higher than those obtainable by the prior procedures utilizing phosphorous and bromine.

In practicing my invention I start with ε-aminocaproic acid, or with a derivative of such acid which can be readily converted thereinto, such as the ε-caprolactam, both this compound and the free acid being readily available in large quantities. These compounds are first treated with an acylating agent by one of the methods well known to the art in order to protect the ε-amino group. While an acetylating agent or other aliphatic acylating compound can be employed, I prefer to protect the amino group with a benzoyl radical because the new intermediate which I obtain by the subsequent treatment with sulfuryl chloride has more advantageous solubility characteristics and may be more readily isolated. The acylaminocaproic acid is then mixed with the sulfuryl halide, there being added a small amount of a catalyst, such as iodine. I prefer to use sulfuryl chloride since it is inexpensive and readily available. The mixture is heated on the water bath until the evolution of gas slackens, which usually occurs after several hours. I then remove the excess sulfuryl halide by distillation, treat the residue with water, collect the precipitated chloro acid, and wash and dry it.

I then ammonolyze the ε-acylamino α-halogenocaproic acid, by one of the methods known to the art, as with concentrated aqueous or alcoholic ammonia, either at room temperature or by heating under pressure. I may also use a mixture of ammonia and ammonium salt, such as ammonium carbonate. When the reaction is complete, I remove the excess ammonia, whereupon ε-acylamino α-aminocaproic acid crystallizes out. This is filtered off and can be converted into dl-lysine by hydrolysis in known manner.

The following example illustrates a satisfactory procedure embodying the present invention, but it will be understood that the same is presented solely for purposes of illustration and not as indicating the limits or scope of the invention:

EXAMPLE

(a) ε-Benzoylaminocaproic acid

| | |
|---|---|
| ε-Caprolactam | 67.8 g. (0.6 mole) |
| NaOH | 48.0 g. (1.2 moles) |
| Water | 300.0 cc. |

The above materials were refluxed for 30 minutes in a 1 liter three-neck flask, pumice being added to regulate the boiling. The solution was then cooled to 15° C. (ice bath) and there were added dropwise and with vigorous stirring and cooling 71 cc. (86.5 g.—0.62 mole) of benzoyl chloride. During the addition the temperature was kept at about 19 to 23° C., the bath being kept at about 13 to 15° C. The time of addition was one and one-half hours and the mixture was additionally stirred for 15 minutes. The reaction mixture was then diluted to 1500 cc. with water and dilute HCl (1:1) was added with stirring. The addition of HCl must be slow at the beginning and seeds must be added to the mixture, as otherwise the acid may precipitate in an oily condition. Altogether, 120 cc. of HCl (1:1) were added, the temperature being kept at about 15° C. The mixture was allowed to stand for about two and one-half hours at this temperature, the benzoylated aminocaproic acid was filtered off, washed free from chlorine, and dried. The acid can be dried at room temperature with or without vacuum or in the oven at 40 to 50°. In this manner the acid was obtained as a fine crystalline powder. If the drying is carried out at 70° or above, the acid melts. It can then be dried in the molten condition, cooled and powdered. Yield: 132 g. (93.5%). M. P. 75 to 78° C.

(b) ε-Benzoylamino-α-chlorocaproic acid

| | |
|---|---|
| ε-Benzoylaminocaproic acid | 35.3 g. (0.15 mole) |
| Sulfuryl chloride | 70 cc. (116 g., 0.86 mole) |
| Iodine | 0.5 g. |

The acid and iodine were powdered and mixed with the SO₂Cl₂ in a 300 cc. ground-joint flask. On shaking for about 20 minutes a homogeneous solution was formed. The flask was warmed on a water bath, using a long reflux condenser connected to a trap. The reaction mixture sometimes separated into two layers and during the reaction the upper layer increased in volume at the expense of the lower layer. The bath was kept at 60 to 65° C. for about one and one-quarter hours, when evolution of gas slowed down. During the next one and one-half hours the temperature was slowly raised to the boiling point. At this point the evolution of gas almost ceased and the sulfuryl chloride no longer refluxed, the excess having been driven off by the HCl and SO₂ during the reaction.

120 cc. of water (room temperature) were added to the hot reaction mixture and the flask was shaken by hand. Reaction with the water took place and finally a red oil sank to the bottom. Shaking of the flask was continued until the red oil became a light yellow. The contents were then poured into a 400 cc. beaker and the hot aqueous layer was used to rinse the flask to remove the oil adhering to the walls. The water was finally decanted and the oil was shaken with 120 cc. of water at 80 to 90° C. (cold water is not quite as suitable). The oil was shaken with the hot water until it become solid, which required about 10 minutes. The water was then decanted from the crude, yellowish chloro-acid. Yield of the wet crude material: 44.4 g.

The wet crude acid can be used directly in the next step. For the purpose of calculating the yield a portion was air dried. The yield of dry, crude, chloro acid was 38.7 to 39.32 g. (96 to 97.5%). M. P. 115 to 125°, which rose to 145 to 147° after recrystallization.

An additional small amount of chloro acid crystallized from the hot mother liquors used for the washing of the crude acid.

(c) ε-Benzoyl-dl-lysine 2.5 g. of the crude wet chloro-acid were dissolved in 40 cc. of concentrated aqueous ammonia and the solution was heated in a pressure bottle for 7½ hours at 85 to 90°. On cooling, the mixture was transferred into a 300 cc. distilling flask and evaporated under vacuum on a boiling water bath almost to dryness. During the evaporation, the benzoyl-lysine crystallizes out. The residue was taken up in a small amount of water, cooled, filtered, washed with a little water, and then with about 15 cc. of methanol and dried at 80 to 90°.

Yield: 1.27–1.3 g. (60%, based on ε-benzoyl-aminocaproic acid). M. P. 265 to 270°.

(d) dl-Lysine 12.5 g. of ε-benzoyl-lysine were refluxed for 10 hours with 76.5 cc. of concentrated HCl and 50 cc. water. The mixture was then evaporated to dryness in vacuo on a water bath. 80 cc. of denatured 95% alcohol were added and the mixture refluxed until the solid material dissolved. The solution was transferred into a 250 cc. beaker and a solution of 5 g. of pyridine in 10 cc. of alcohol was added. The mixture was allowed to stand over night, after which the precipitated dl-lysine hydrochloride was filtered off, washed with 25 cc. alcohol and dried at about 80°.

Yield: 8.02 g. (88.5%). M. P. 260° with decomposition.

The purification of the crude dl-lysine hydrochloride was carried out as follows: 5 g. of the crude material were dissolved in 15 cc. of water, the solution was charcoaled hot, filtered, washed with 5 cc. of boiling water and 80 cc. of denatured 95% alcohol added. The mixture was allowed to stand over night, after which the mother liquor was decanted and the crystals stirred with a mixture of 40 cc. of 95% alcohol and 7 cc. of water. The crystals were then filtered off and dried in vacuo.

I claim:

1. The process which comprises heating and reacting ε-benzoylamino caproic acid with sulfuryl chloride in the presence of a catalytic amount of iodine until the α-chloro acid is formed, heating the product with ammonia to form the ε-benzoylamino-α-amino acid, and heating the latter with a hydrolyzing agent to free the ε-amino group.

2. The process which comprises heating and reacting ε-benzoylamino caproic acid with sulfuryl chloride in the presence of a catalytic amount of iodine until the α-chloro acid is formed.

3. The process which comprises heating and reacting ε-benzoylamino caproic acid with sulfuryl chloride until the α-chloro acid is formed.

4. Process for the manufacture of dl-lysine which comprises heating ε-benzoylamino caproic acid with a sulfuryl halide, heating the α-halogen acid so formed with ammonia to form the corresponding α-amino acid, and heating the product with a hydrolyzing agent to free the ε-amino group.

5. Process according to claim 4 wherein the sulfuryl halide is the chloride.

ALEXANDER GALAT.

REFERENCES CITED

The following references are of record in the file of this patent:

UNITED STATES PATENTS

| Number | Name | Date |
|---|---|---|
| 2,302,228 | Kharasch et al. | Nov. 17, 1942 |

FOREIGN PATENTS

| Number | Country | Date |
|---|---|---|
| 157,816 | Germany | Jan. 18, 1905 |

OTHER REFERENCES

Lassar-Cohn: "Arbeitsmethoden für Organisch-Chem. Lab.," 4th Edit., Special Part (1907), p. 385 and pp. 452 to 456.

Braun: "Ber. Deut. Chem.," vol. 42 (1909), pp. 842–845.

Eck et al.: "J. Biol. Chem.," vol. 106 (1934), pp. 388–391.